US006822150B1

(12) United States Patent
Lombardi

(10) Patent No.: US 6,822,150 B1
(45) Date of Patent: Nov. 23, 2004

(54) PERCUSSION INSTRUMENT STAND WITH GUIDED PEDAL MOVEMENT

(75) Inventor: Donald G. Lombardi, Thousand Oaks, CA (US)

(73) Assignee: Drum Workshop, Inc., Oxnard, CA (US)

( * ) Notice: Subject to any disclaimer, the term of this patent is extended or adjusted under 35 U.S.C. 154(b) by 0 days.

(21) Appl. No.: 10/389,843

(22) Filed: Mar. 18, 2003

(51) Int. Cl.[7] .................................................. G01D 13/02
(52) U.S. Cl. ....................................... 84/422.3; 84/422.1
(58) Field of Search ............................. 84/422.1, 422.2, 84/422.3

(56) References Cited

U.S. PATENT DOCUMENTS 6,188,007 B1 * 2/2001 Liao ........................... 84/422.3
6,307,136 B1 10/2001 Sikra et al.
6,528,714 B1 * 3/2003 Liao ........................... 84/422.3

* cited by examiner

*Primary Examiner*—Kimberly Lockett
(74) *Attorney, Agent, or Firm*—William W. Haefliger

(57) ABSTRACT

A percussion instrument stand, comprising in combination, an upright elongated support; an operator movable lengthwise of the support to activate at least one cymbals disc; a frame from which the support extends upwardly; a foot pedal to effect operator movement lengthwise of the support; a base on which the pedal is hingedly carried; and mechanism to movably interconnect the base and frame to allow controlled base movement between a working position in which the pedal can offset operator movement, and a stored position in which the base and pedal are collapsed upwardly toward the support. The base may be in plate or wire form.

30 Claims, 9 Drawing Sheets

PERCUSSION INSTRUMENT STAND WITH GUIDED PEDAL MOVEMENT

BACKGROUND OF THE INVENTION

This invention relates generally to improvements in percussion instrument stands, as for example that support cymbals; and more particularly concerns percussion instrument stands that are collapsible, as for transportation and storage.

Such stands typically have multiple supporting legs that are extensible and retractable, as between working and storage positions. There is need for improvements in such devices where one of the legs is or may be associated with a foot operated pedal usable by the musician to operate or play the percussion instrument. Collapsing of the pedal toward stored position has presented problems, such as maintenance of sturdy and adequate support for the pedal and stand during use; difficulty with upward collapse of the pedal, and maintenance of the pedal in stored position, without unwanted self-extension; and inadequate maintenance of such downward extension into stand supporting position, from stored position, when desired.

SUMMARY OF THE INVENTION

It is a major object of the invention to provide improvements meeting the above needs, in a simple, sturdy, and easily operated percussion instrument stand assembly, or combination, of components. Basically, the improved stand apparatus comprises a) an upright elongated support, such as a tube, b) an operator or link movable lengthwise of the support to activate at least one cymbals disc, c) a frame from which the support extends upwardly, d) a foot pedal to effect operator or link movement lengthwise of the support, e) a base on which the pedal is hingedly carried, f) and mechanism to movably interconnect the base and frame to allow controlled base movement between a working position in which the pedal can effect such operator movement, and an upwardly stored position in which the base and pedal are collapsed upwardly, toward the support.

As will be seen, the operator may include a chain urged upwardly by a spring, and spring tension is reduced in upwardly stored position of the base. Another object is to provide an improved stand in which mechanism is provided and characterized in that the base has guided interconnection with the frame. Such mechanism may define a sliding guided interconnection between the base and frame to hold the components in such proximity to one another as to meet the needs referred to. Further, the mechanism may include at least one pedal and a base movement guiding guide slot, and may advantageously include two parallel guide slots, sidewardly spaced apart in an upright frame. Sliders may be carried by the base to slide in those slots, as the base is moved between working and stored positions. Equivalents of such guiding mechanism may be provided.

A further object includes provision of a holder positioned to positively hold the base to the frame in its working position and during repetitive impact during cymbals playing. The holder may for example include components on the frame and base that effect an interfit relation when the base is moved into working position. The components may advantageously include a recess, or recesses, on the base, and projection or projections on the frame that automatically fit into said recess or recesses as the base is moved into working position, whereby a highly sturdy and easily manipulated assembly is provided.

A yet further object includes provision of such a holder below the level of the guide slot or slots to hold the base to the frame at a low level, in working i.e. playing position. Two such holders may be provided below the levels of two guide slots, as will appear.

Yet another object is to provide the base with a flat, elongated lower portion to engage the floor, and two upright flanges in which such interfit recesses are formed. In this regard, pivotal connections may be provided between the flanges and the sliders, to enable upward pivoting and sliding of the base and pedal, toward stored position.

An added object is to provide the base in the form of wires that project forwardly for controlled pivoting movement relative to the frame. A slide connection may be provided between the wires and the frame, allowing pivoting of the elongated percussion instrument support, between extended and collapsed positions.

A yet further object is to provide guide slots in the frame, the wires extending into proximity to such slots; and holders may be provided for adjustably holding forward portions of the wires to the respective frame legs, in selected positions along the slots.

Another object is to provide rotary bearing connection between a heel plate and the pedal, that connection located at an underside of the plate to which the wires are also connected.

An additional object is to provide an elongated rod or rods adjustably connected to the frame, and extending downwardly proximate one or both slotted frame legs, to engage a rod terminal or terminals with a support surface on which the wires are supported to resist movement of the wires relative to the support surface.

These and other objects and advantages of the invention, as well as the details of an illustrative embodiment, will be more fully understood from the following specification and drawings, in which:

DRAWING DESCRIPTION

DETAILED DESCRIPTION

Figure 8:
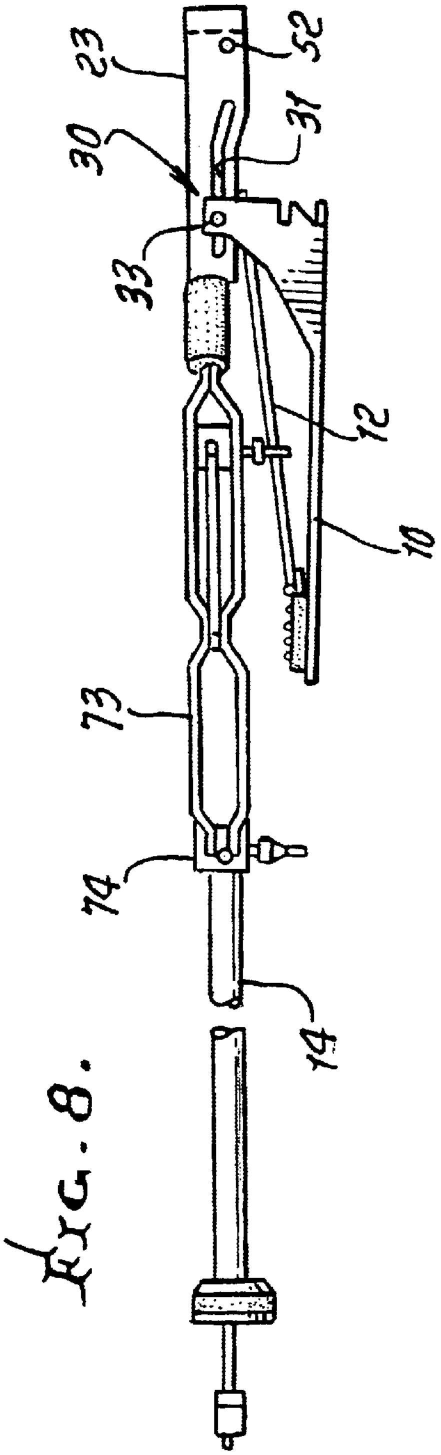
FIG. 8 is a view like FIG. 7 showing the elongated cymbal support in generally horizontal stored position.

In the drawings, a base or base plate 10 is adapted to engage the floor 11 in cymbals playing, i.e. working position, and may have a rubber sole 10*a*, if desired. A foot pedal 12 is carried by the base to move up and down as the cymbals are played. An operator such as a rod 13 is movable lengthwise of and within an elongated upright support tube 14. An operator chain 15 extends between and interconnects the forward end 12*a* of the pedal with the lower end 13*a* of the rod, and a spring 17 in the tube pushes the rod upwardly, via a flange 18 on the rod, holding the upper disc 20*a* of the cymbals 20 in up position, under rest conditions. When the pedal 12 is pushed down, the chain and rod are pulled down, to depress disc 20*a* toward and against lower disc 20*b*. It is important that the chain, and/or spring, not be tensioned (or to have reduced tension) when the base plate 10 and pedal 12 are pivoted relative to tube 14 into stored position as seen in FIG. 8. One feature of the invention is to assure such absence of tension, or reduced tension, in 17 and 15 in that stored position, to be described below. Stored condition can exist for long time intervals.

Figure 4:
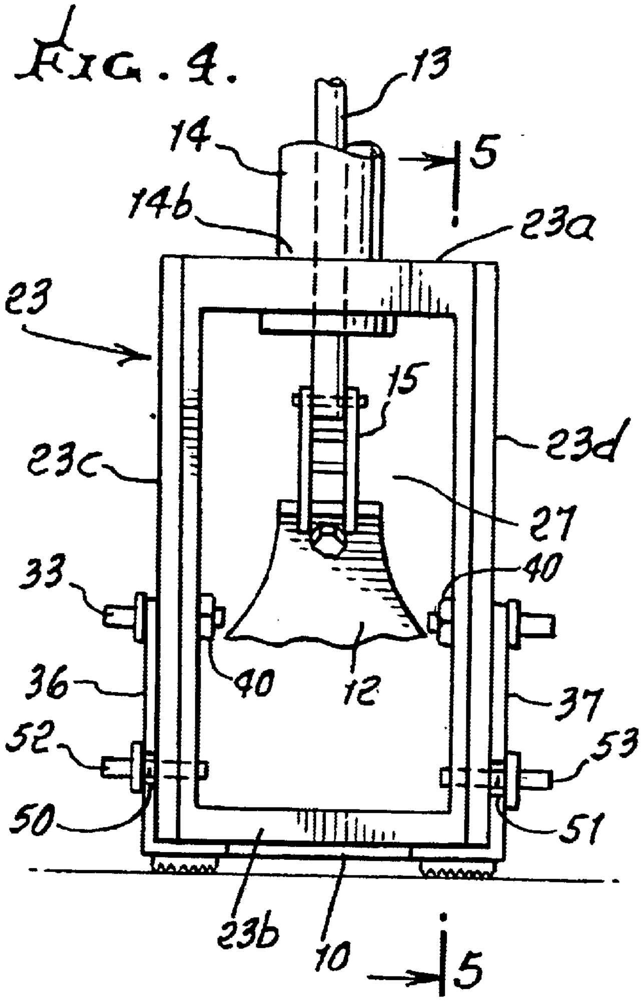
FIG. 4 is an elevation taken on lines 4—4 of FIG. 2.

In accordance with one important aspect of the invention, a frame is provided from which the support tube 14 extends upwardly, and typically tube 14 is connected to the top of the frame. See for example, frame 23 having a horizontal top member 23*a*, bottom member 23*b*, and upright side members 23*c* and 23*d* which are parallel and transversely spaced apart. The bottom 14*b* of tube 14 is typically connected as shown to member 23*a*, whereby the lower end 13*a* of rod 13 projects below the level of member 23*a*, and chain 15 may be located to flex and move up and down in the space 27 between upright members 23*c* and 23*d*. See FIG. 4.

Mechanism is provided to movably interconnect the base and frame to allow controlled base movement between a working position in which the pedal can effect said operator rod movement, and an upwardly stored position in which the base and pedal are collapsed upwardly toward said support tube 14. Typically, that improved mechanism is characterized in that the base has guided interconnection with the frame; and it may define a sliding guided connection between the base and the frame.

Figure 5:
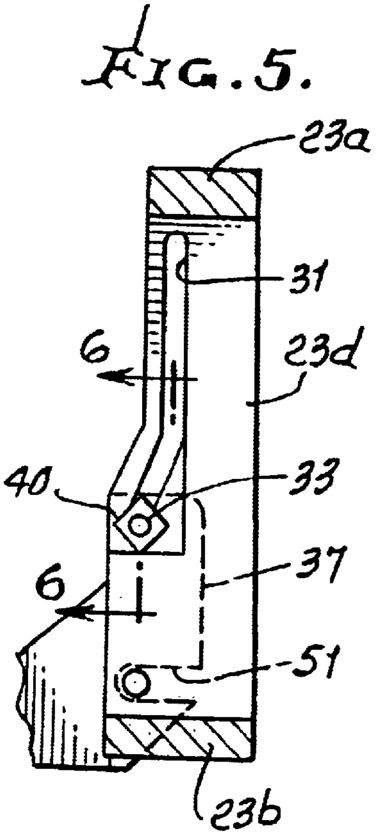
FIG. 5 is a section taken in elevation on lines 5—5 of FIG. 4.
Figure 6:
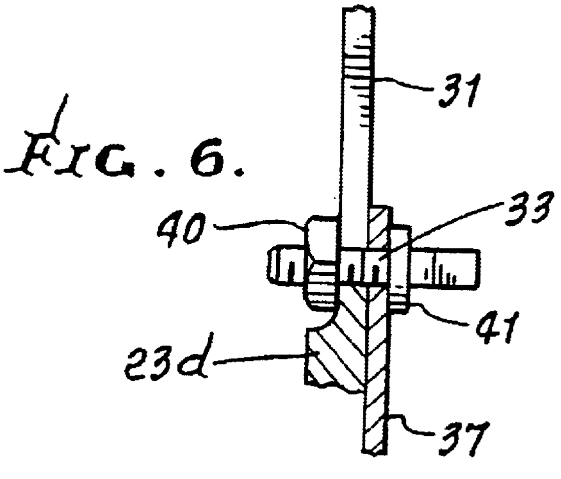
FIG. 6 is an enlarged fragmentary section taken on lines 6—6 of FIG. 5.
Figure 7:
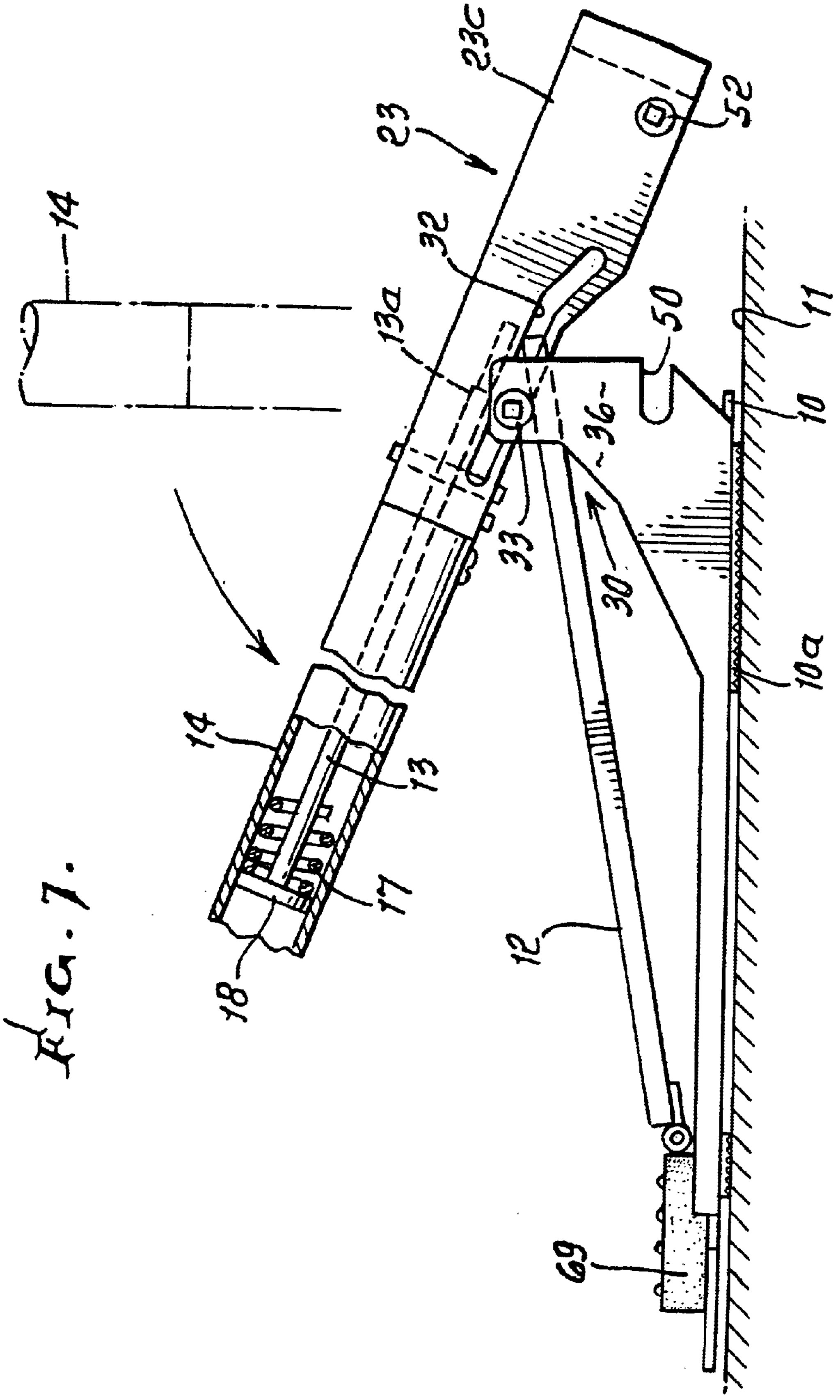
FIG. 7 is a view like FIG. 2, but showing transition of the elongated cymbal support, from extended upright position toward generally horizontal stored position, i.e. approximately 90° swinging movement of that support.

In the drawings, the preferred mechanism is indicated generally at 30, as in FIG. 5. The sliding guided interconnection between the base and frame typically includes at least one guide slot, although two such slots extending in parallel relation are preferred, for stability as during sliding movement. See for example the two like parallel slots 31 and 32 in the transversely spaced members 23*c* and 23*d*. Sliders are carried by the base to slide in such slots as the base is bodily moved between said working and stored positions. See for example the transverse pins one of which is seen at 33 in FIG. 6, extending through a slot 31, and guidedly movable along, i.e. lengthwise of that slot as the base 10 is moved as in FIG. 7 between upright position (See FIG. 2) and stored position (see FIG. 8).

In this regard, the base may have two tramsverse upright flanges 36 and 37, through which the pins 33 extend, and tightenable pivots maybe provided between the flanges and frame to allow pivoting of the frame relative to the flanges. To this end, each pin may be threaded, and a nut 40 on the pin thread may be tightened to clamp the flange to the frame, between the nut and a stop 41, as in each of the stored and extended positions of the base relative to the tube 14 to hold the frame against pivoting relative to the base. Note that in FIG. 8, that the pin 33 has slidably moved in the slot 31 toward the upper end of the slot, in stored position of the base, relieving spring and chain tension. During pivoting, the frame both pivots and translates bodily, as pin 33 travels in the slot.

Figure 1:
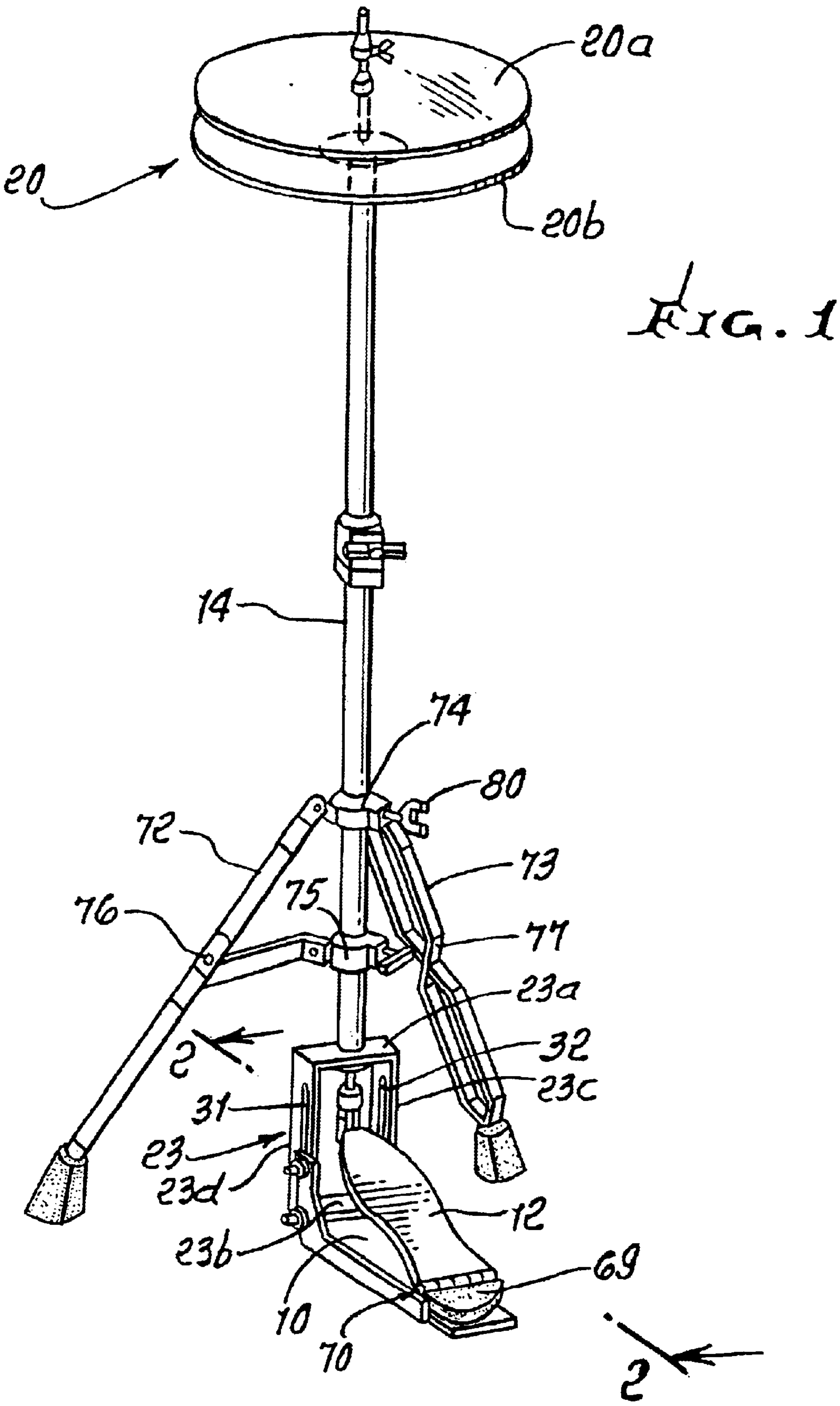
FIG. 1 is a perspective view of one form of apparatus embodying the invention.
Figure 2:
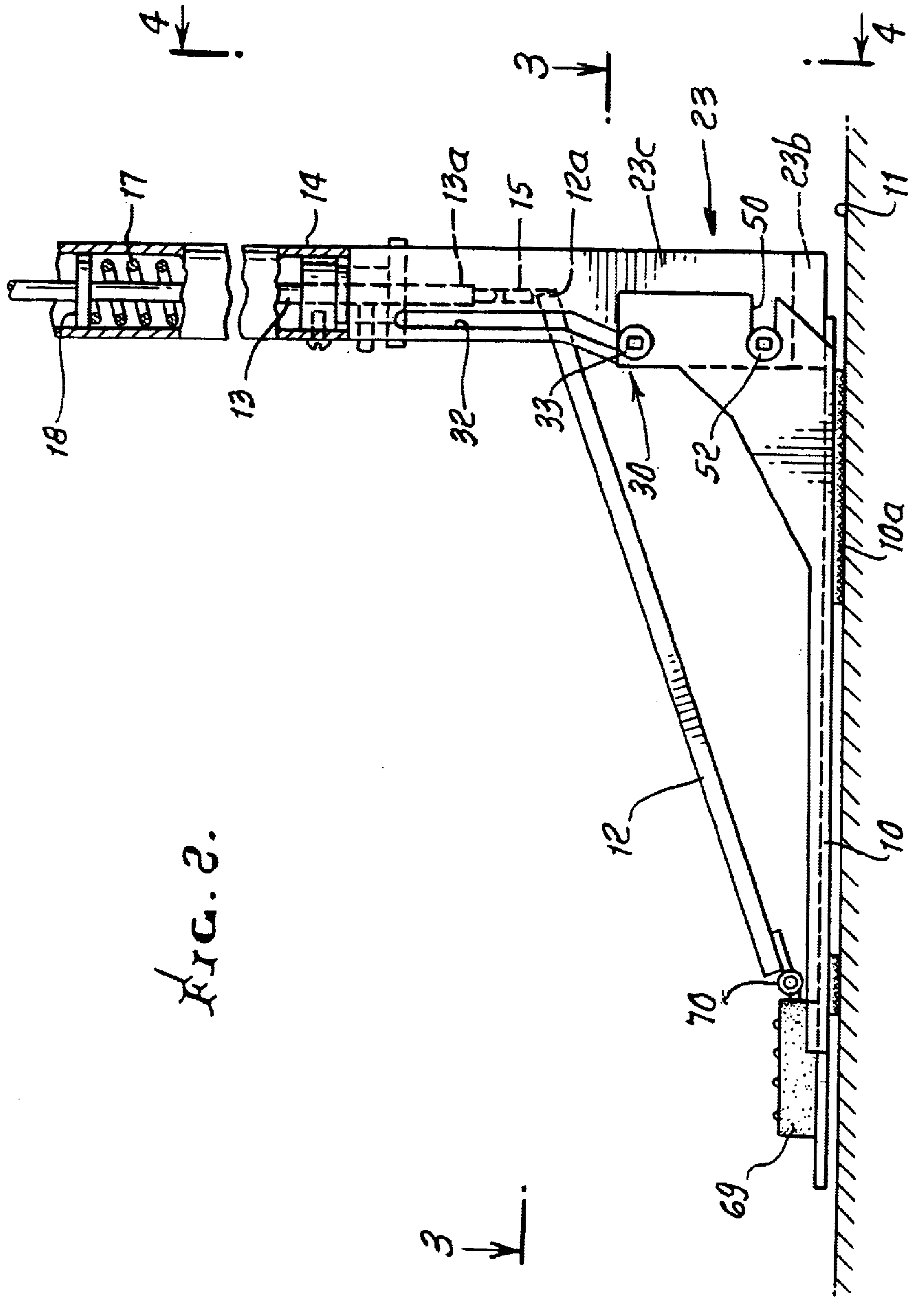
FIG. 2 is an enlarged side elevation taken on lines 2—2 of FIG. 1.
Figure 3:
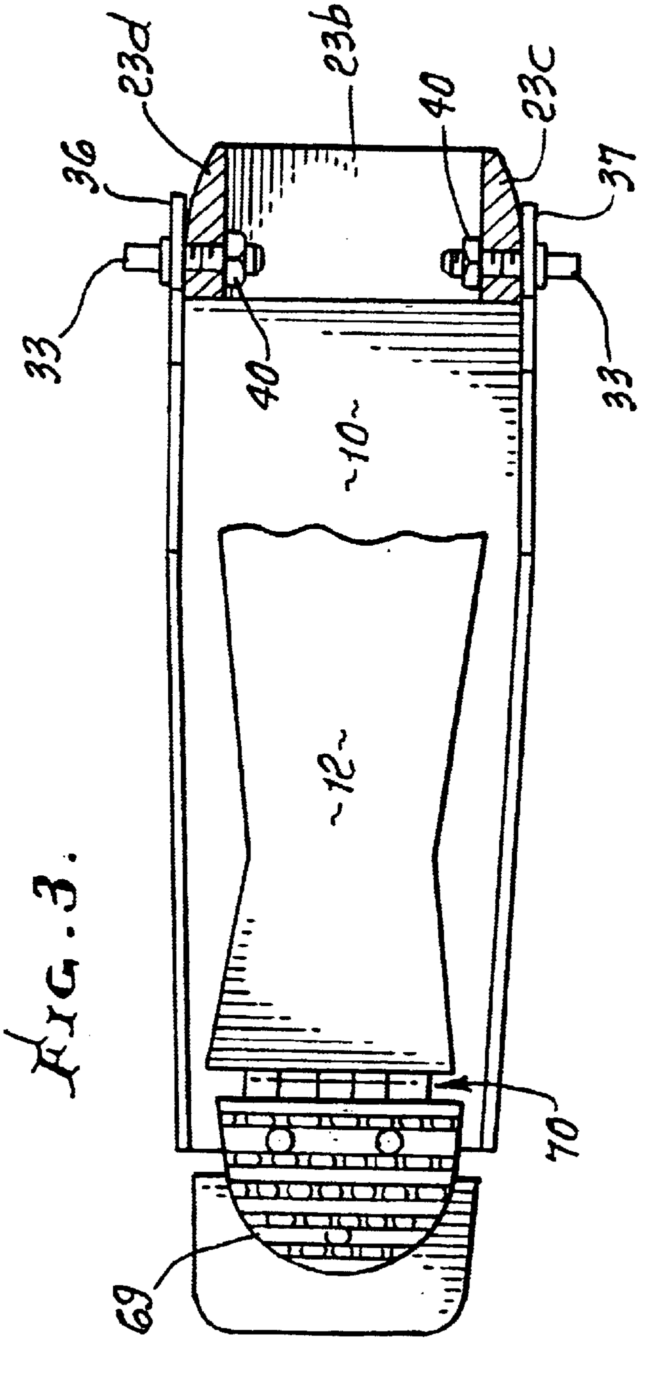
FIG. 3 is a plan view taken in section on lines 3—3 of FIG. 2.

Also provided is a holder positioned to hold the base to the frame in said working position, i.e. FIG. 1 position. Typically, the holder may include components on the frame and base that interfit when the base is moved into working position; and such components may include a recess or recesses on the base, and projections on the frame that fit into said recess, as the base is moved into working position. See for example, the generally horizontally extending recesses 50 and 51 provided in the base flanges 36 and 37, and the sideward projections 52 and 53 on and from the frame member 23*c* and 23*d* lower extents. FIG. 2 shows the projections located near the lower ends of frame side members 23*c* and 23*d*, and near the base plate, for stability during cymbals playing in extended (deployed) position of the base 10 and tube 14. In stored position, as seen in FIG. 8, and also in the FIG. 7 transition view, the projections 52 and 53 are spaced a considerable distance from the recesses 50 and 51. In each of FIGS. 2 and 8, the frame and base may be clamped together, as by tightening of the pivots as described (see FIG. 6), and by tightening of the projections 52 and 53, which may have the same fastener and nut construction as the pivots.

Pedal 12 preferably has roller bearing pivotal connection to a heel pad 69 on the base, at location 70, as for example as disclosed in my U.S. Pat. No. 5,627,332, incorporated herein by reference.

Referring again to FIG. 1, two support legs 72 and 73 are typically pivotally carried by the tubing 14. Note collars 74 and 75 extending about and coupled to the tubing, pivotally connected at 76 and 77 to the support legs. This allows slidable extension of the legs for vertically stabilized support of the apparatus, as in FIG. 1 position, or collapse of the legs for transport, as seen in FIG. 8, with the legs extending alongside the tubing. A wing nut 80 may be tightened to clamp collar 74 to the tube 14.

While the apparatus of FIGS. 1-8 is preferred, an unusually advantageous modified form of the apparatus is seen at 100 in FIGS. 9-16. Components which are the same as those of FIGS. 1-8 bear the same identifying numerals.

A modified base 110 is in the form of two like metallic support wires 110*a* which extend forwardly, and are laterally separated. Wire elongated support portions 110*b* engage the support surface 11.

Figure 9:
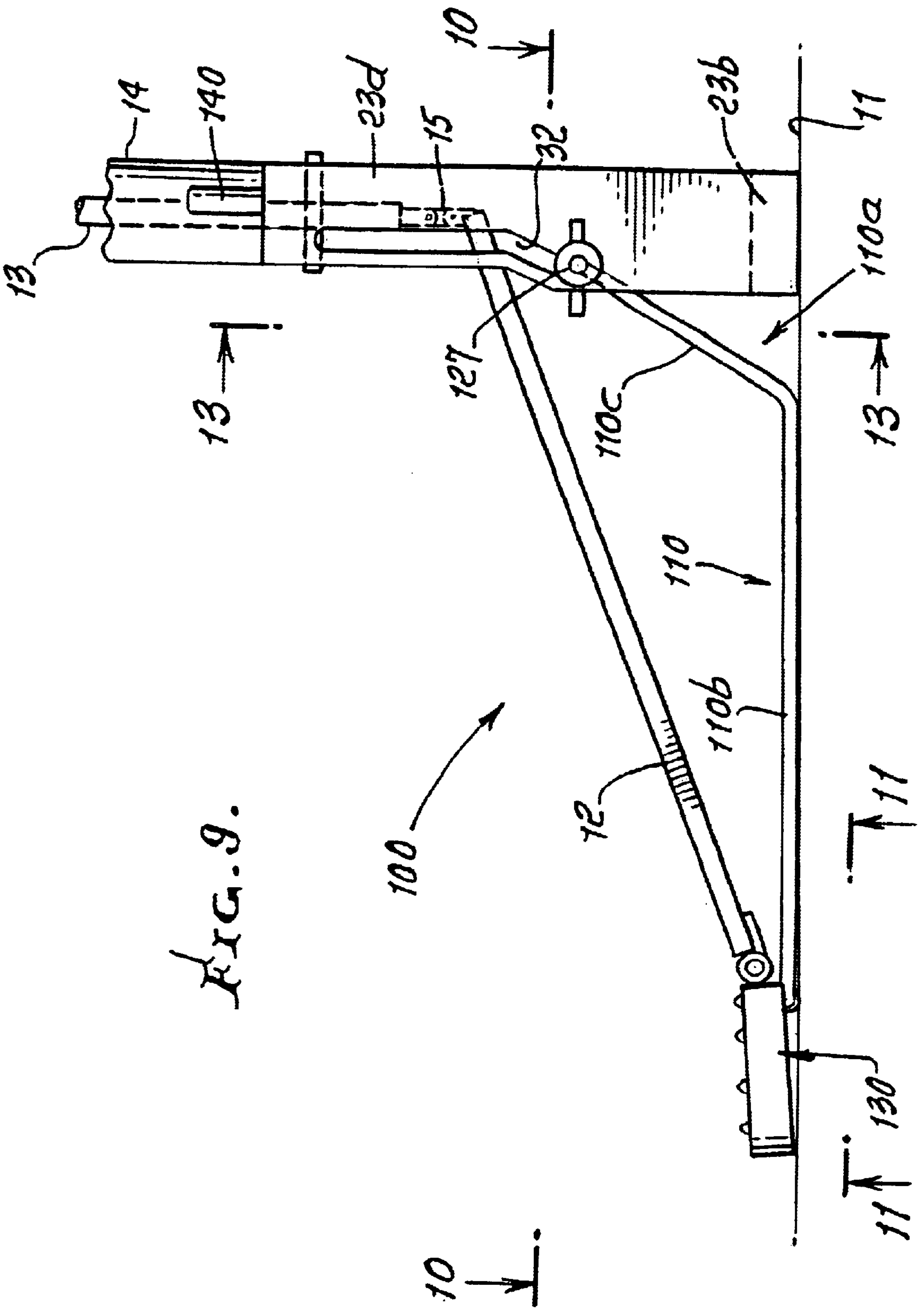
FIG. 9 is a side elevation, like FIG. 1, showing a modification.

Wire forward portions 110*c* are angled upwardly and extend in FIG. 9 into proximity to lower portions of the two guide slots 31 and 32 in frame legs or members 23*c* and 23*d*.

Holders are provided for adjustably holding the wires to the respective legs in selected positions along the slots, the holders including sliders slidable along the slots.

Figure 10:
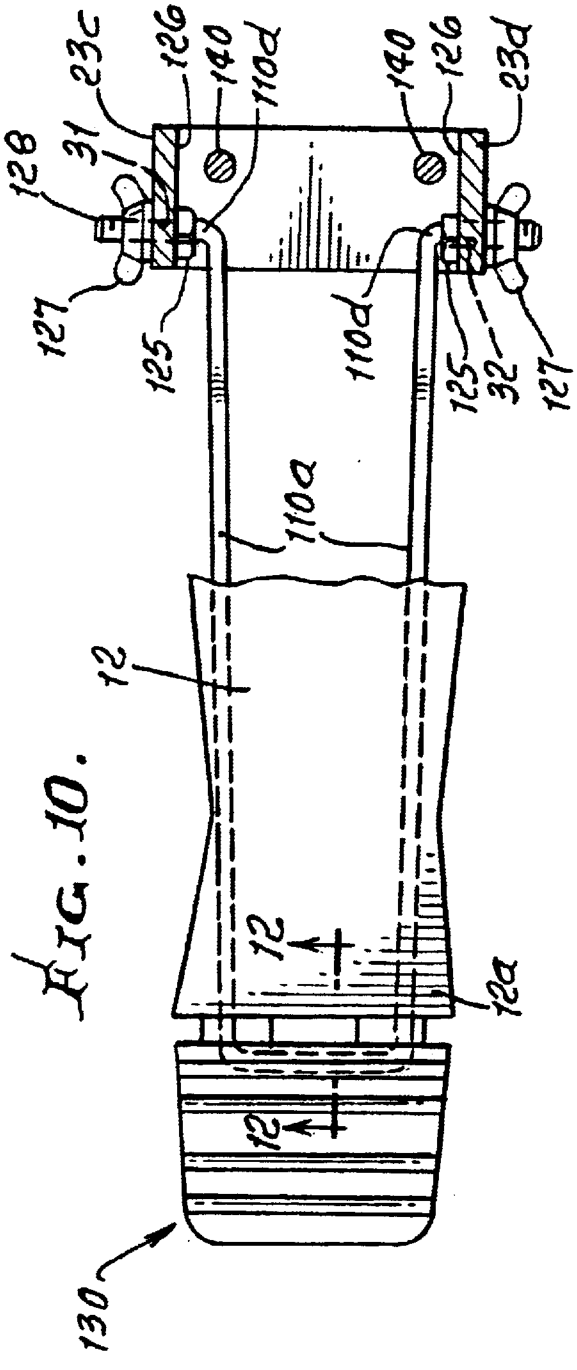
FIG. 10 is a plan view taken partly in section, on lines 10—10 of FIG. 9.

As seen in FIG. 10, the holders may comprise turned end portions 110*d* of the wires, which project laterally through slots, so as to be slidable along the slots. Clamps to hold the end portions to the frame legs are shown in the form of nuts 125 thread connected onto the wire end portions at the inner sides 126 of the legs 23*c* and 23*d*, and adjustable wing nuts 127 thread connected onto the wire end portions at the outer sides 128 of those legs, for adjustable clamping.

Figure 11:
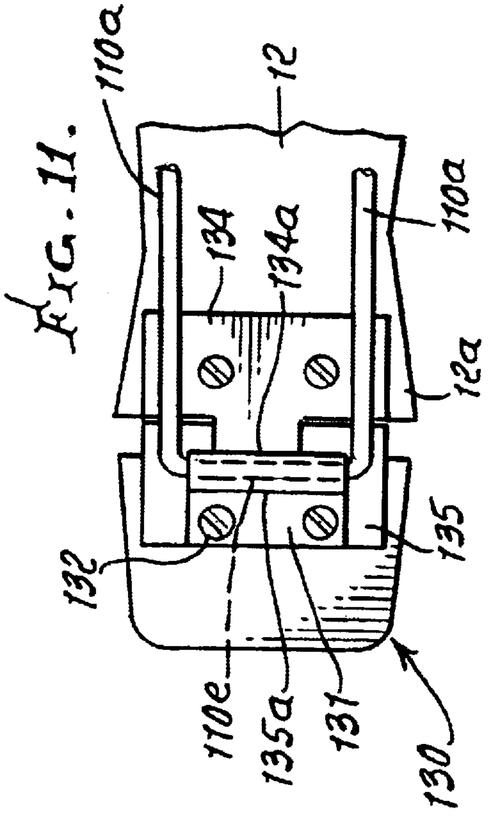
FIG. 11 is a bottom plan view taken on lines 11—11 of FIG. 9.
Figure 12:
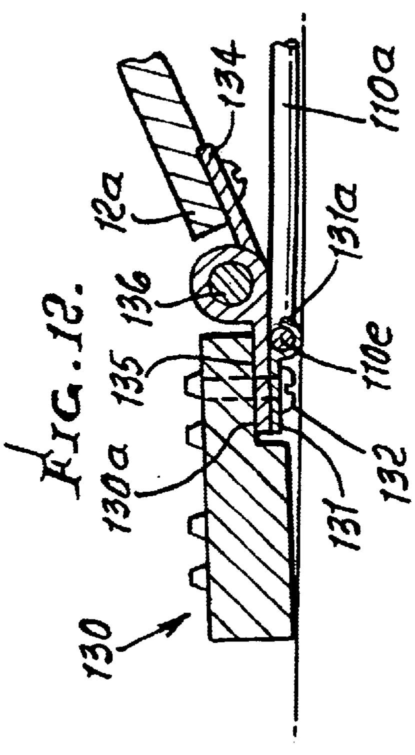
FIG. 12 is a vertical section taken on lines 12—12 of FIG. 10.
Figure 13:
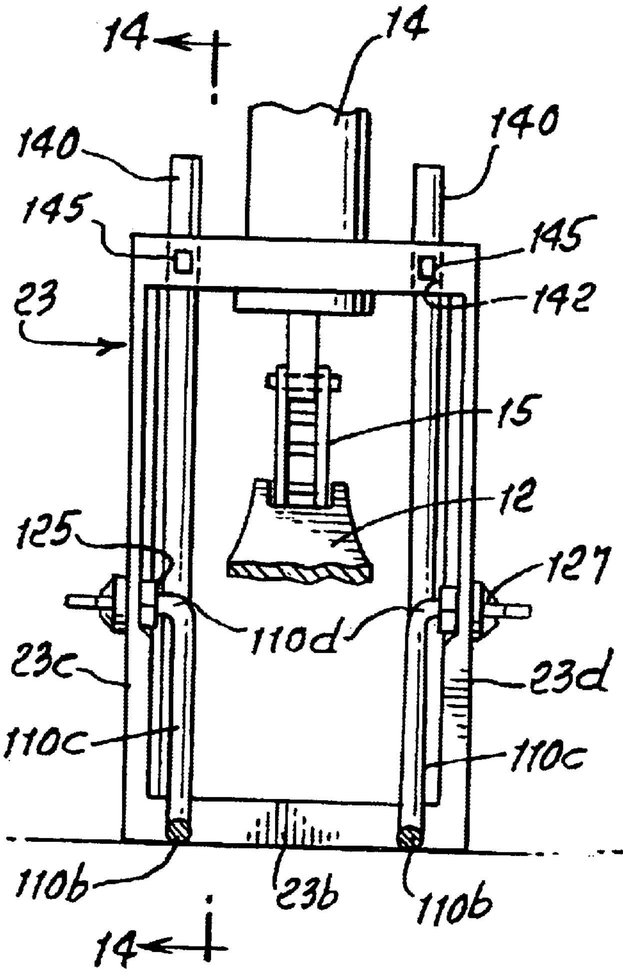
FIG. 13 is an elevation taken on lines 13—13 of FIG. 9.
Figure 14:
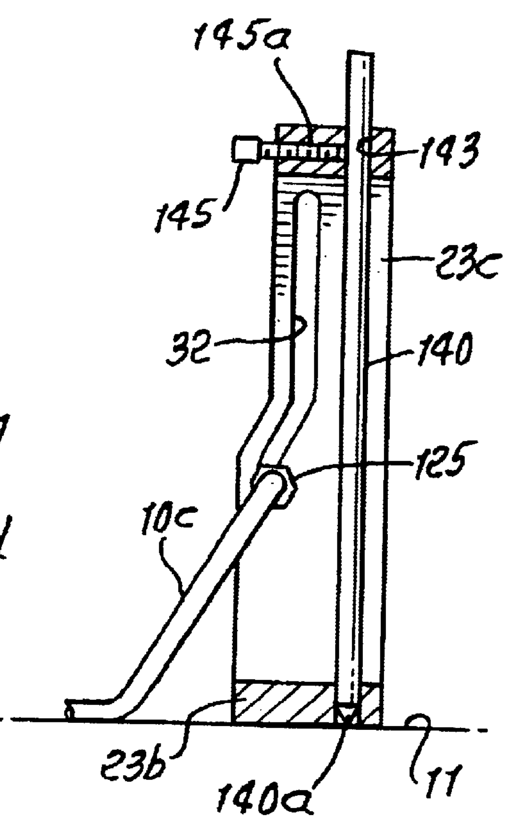
FIG. 14 is an elevation taken on lines 14—14 of FIG. 13.

FIGS. 11 and 12 show connection of the wires 110*a* to a heel plate 130. For this purpose, the wires may be connected together as via a wire bend 110*e*, having U-shaped configuration. A clamp plate 131 is connected to the underside 130*a* of the head plate, as by fasteners 132; and receptacle 131*a* formed by the plate receives the bend 110*e*.

As also shown in FIGS. 11 and 12, the pedal 12 has rotary bearing connection to the heel plate. See connector component plate 134 connected to the rear 12*a* of the pedal, and connector component plate 135 connected to the underside 130*a* of the heel plate. The plates 134 and 135 have bearing portions 134*a* and 135*a* embracing a bearing 136, so that 134 is rotatable relative to 135. Fasteners 132 also retain component plate 135 connected to the underside 130*a* of the heel plate, providing a very simple and advantageous connection structure.

At least one rod is carried by the frame and having a lower terminal to engage a surface on which the base is supported to resist movement of the base relative to the surface. See for example the two laterally spaced rods 140 having lower terminals 140*a* that are tapered downwardly to engage the surface 11. The two rods extend through upper and lower openings 143 and 144 in the frame, and screws 145 thread connected to the frame at 145*a* engage the rods to hold them in adjusted position.

Figure 15:
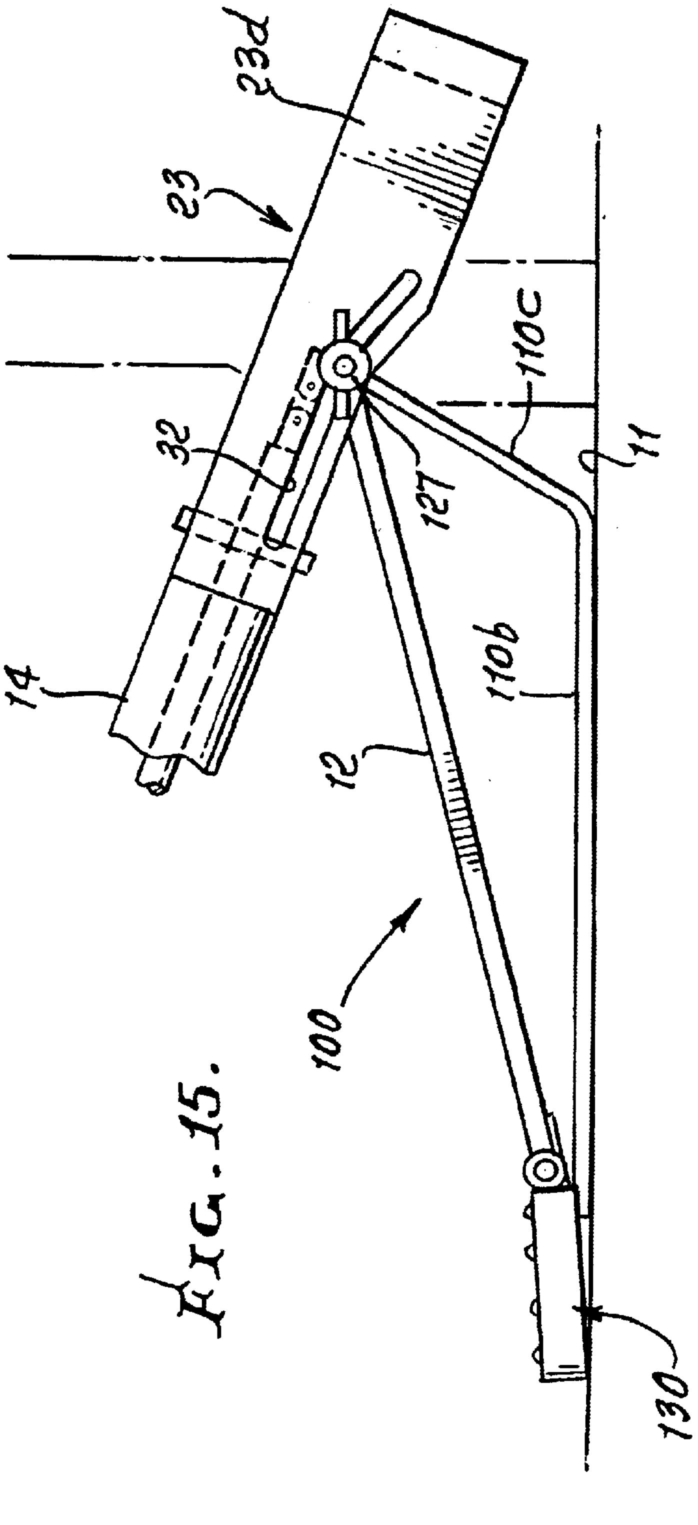
FIG. 15 is a view like FIG. 9, but showing transition of the elongated cymbal support, from extended upright position toward generally horizontal position.
Figure 16:
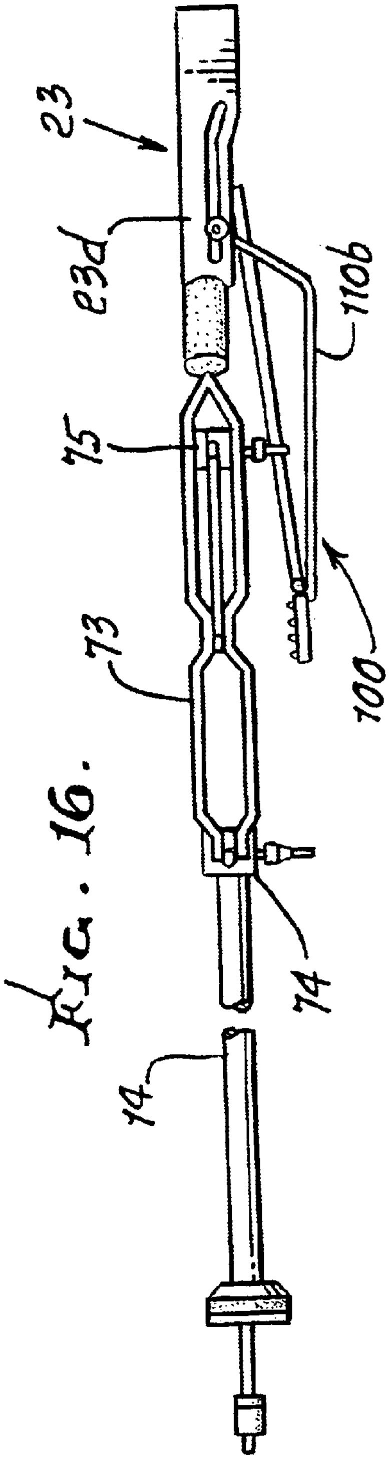
FIG. 16 is a view like FIG. 15, but showing the elongated cymbal support in generally collapsed position.

FIG. 15 shows the apparatus 100 of FIG. 9 in transition from extended upright position toward generally horizontal position; and FIG. 16 shows the apparatus of FIG. 9 in generally collapsed position.

I claim:

1. A percussion instrument stand, comprising in combination a) an upright elongated support, b) an operator movable lengthwise of the support to activate at least one cymbals disc, c) a frame from which the support extends upwardly, d) a foot pedal to effect operator movement lengthwise of the support, e) a base on or above which the pedal is hingedly carried, f) and mechanism to movably interconnect the base and frame to allow controlled base movement between a working position in which the pedal can effect said operator movement, and an upwardly stored position in which the base and pedal are collapsed upwardly toward said support, g) the base comprising wires protecting forwardly, said mechanism providing a slide connection allowing controlled pivoting movement of the wires relative to the frame.

2. The combination of claim 1 in which said mechanism is characterized in that the base has guided interconnection with the frame.

3. The combination of claim 1 in which said mechanism defines a sliding guided interconnection between the base and frame, allowing both relative pivoting and relative bodily translation of the frame and base.

4. The combination of claim 3 wherein said interconnection includes at least one guide slot.

5. The combination of claim 3 wherein said interconnection includes two parallel guide slots.

6. A percussion instrument stand, comprising in combination a) an upright elongated support, b) an operator movable lengthwise of the support to activate at least one cymbals disc, c) a frame from which the support extends upwardly, d) a foot pedal to effect operator movement lengthwise of the support, e) a base on or above which the pedal is hingedly carried, f) and mechanism to movably interconnect the base and frame to allow controlled base movement between a working position in which the pedal can effect said operator movement, and an upwardly stored position in which the base and pedal are collapsed upwardly toward said support, g) said mechanism defining a sliding guided interconnection between the base and frame, allowing both relative pivoting and relative bodily translation of the frame and base, h) said interconnection including two parallel guide slots, i) wherein the frame extends upright, said two slots are defined by the frame, and there being sliders carried by the base to slide in said slots as the base is bodily moved between said working and stored positions.

7. The combination of claim 1 including a holder positioned to hold the base to the frame in said working position.

8. The combination of claim 7 wherein said holder includes components on the frame and base that interfit when the base is moved into said working position.

9. The combination of claim 8 wherein said components include a recess or recesses on the base, and a projection or projections on the frame that fit into said recess or recesses as the base is moved into said working position.

10. A percussion instrument stand, comprising in combination a) an upright elongated support, b) an operator movable lengthwise of the support to activate at least one cymbals disc, c) a frame from which the support extends upwardly, d) a foot pedal to effect operator movement lengthwise of the support, e) a base on or above which the pedal is hingedly carried, f) and mechanism to movably interconnect the base and frame to allow controlled base movement between a working position in which the pedal can effect said operator movement, and an upwardly stored position in which the base and pedal are collapsed upwardly toward said support, g) said mechanism defining a sliding guided interconnection between the base and frame, allowing both relative pivoting and relative bodily translation of the frame and base, h) said interconnection including at least one guide slot, i) and including a holder positioned below the level of the guide slot to stabilize and hold the base to the frame in said working position.

11. The combination of claim 10 wherein the holder includes components on the frame and base that interfit when the base is moved into said working position.

12. A percussion instrument stand, comprising in combination a) an upright elongated support, b) an operator movable lengthwise of the support to activate at least one cymbals disc, c) a frame from which the support extends upwardly, d) a foot pedal to effect operator movement lengthwise of the support, e) a base on or above which the pedal is hingedly carried, f) and mechanism to movably interconnect the base and frame to allow controlled base movement between a working position in which the pedal can effect said operator movement, and an upwardly stored position in which the base and pedal are collapsed upwardly toward said support, g) said mechanism defining a sliding guided interconnection between the base and frame, allowing both relative pivoting and relative bodily translation of the frame and base, h) said interconnection including two parallel guide slots, i) and including two holders respectively positioned below the levels of the guide slots to hold the base to the frame in said working position.

13. The combination of claim 12 wherein each holder includes components on the frame and base that interfit when the base is moved into said working position.

14. The combination of claim 13 wherein the components of each holder include a recess on the base, and a projection on the frame that fits into said recess as the base is moved into said working position.

15. The combination of claim 14 wherein the base has a flat elongated lower portion to engage the floor, and two upright flanges in which said recesses are formed.

16. The combination of claim 15 wherein tightenable pivots are provided between the flanges and the frame.

17. The combination of claim 1 including cymbals discs associated with said upright support.

18. The combination of claim 16 wherein said pivots extend in said slots to slide therealong during movement of the base and pedal toward said stored position.

19. The combination of claim 1 wherein the operator includes a chain urged upwardly by a spring, and tension in the spring is reduced when the base is in upward stored position.

20. The combination of claim 10 wherein said base comprises one of the following:

i) a plate connected to the pedal ii) two wires connected to the pedal.

21. The combination of claim 1 wherein said connection includes at least one guide slot in the frame.

22. The combination of claim 1 wherein said connection includes two parallel guide slots in the frame, the wires extending into proximity to said respective guide slots.

23. The combination of claim 22, wherein the frame has spaced legs in which said slots are located.

24. The combination of claim 23, wherein the mechanism includes holders for adjustably holding the wires to the respective legs in selected positions along the slots, the holders including sliders slidable along the slots.

25. The combination of claim 1 including a heel plate having an underside, the base connected to the heel plate proximate said underside.

26. The combination of claim 1 wherein the pedal has rotary bearing connection to the heel plate, said connection including a component connected to the heel plate proximate said underside.

27. The combination of claim 10 wherein the base comprises two elongated wires connected to the heel plate underside.

28. The combination of claim 20 including at least one rod carried by the frame and having a lower terminal to engage a surface on which the base is supported to resist movement of the base relative to the surface.

29. The combination of claim 1 wherein there are two rods carried by the frame and having lower terminals to engage a surface on which the base is supported to resist movement of the base relative to the surface.

30. The combination of claim 24, wherein the wires have turned end portions projecting through the respective slots, and the holders include adjustable clamps for adjustably clamping said wire end positions to the frame structure adjacent the slots.

* * * * *